United States Patent [19]
Kocher

[11] 3,789,675
[45] Feb. 5, 1974

[54] GAS COMPRESSOR HAVING ROLLING TYPE SEALING DIAPHRAGM

[75] Inventor: Erich J. Kocher, Milwaukee, Wis.

[73] Assignee: Vilter Manufacturing Corporation, Milwaukee, Wis.

[22] Filed: May 30, 1972

[21] Appl. No.: 257,662

[52] U.S. Cl. .................... 74/18.2, 92/98 D, 92/168
[51] Int. Cl. ........................................... F01b 19/00
[58] Field of Search 92/98 RD, 168, 98 R, 151, 152; 74/18.2

[56] References Cited
UNITED STATES PATENTS

| | | | |
|---|---|---|---|
| 1,329,878 | 2/1920 | Barrett | 92/168 |
| 2,757,542 | 8/1956 | Klinger | 74/18.2 |
| 2,864,258 | 12/1958 | Klinger | 74/18.2 |
| 3,310,230 | 3/1967 | Wirth | 92/168 |
| 3,060,754 | 10/1962 | Klinger | 74/18.2 |

FOREIGN PATENTS OR APPLICATIONS

| | | | |
|---|---|---|---|
| 6,746 | 3/1903 | Great Britain | 74/18.2 |
| 118,901 | 2/1927 | Switzerland | 74/18.2 |

*Primary Examiner*—Paul E. Maslousky
*Attorney, Agent, or Firm*—James E. Nilles

[57] ABSTRACT

Oil leakage from the crankcase into the compression chamber of a reciprocating gas compressor is positively prevented by a rolling diaphragm within the compression cylinder. A fixed mounting ring for the diaphragm surrounds a piston rod within the cylinder, and a flexible hollow sealing sleeve has a radially inner connection with the piston rod and a radially outer connection with the mounting ring. During axial movement of the piston rod the sealing sleeve rolls at one side of its connections with the mounting ring and piston rod radially inward upon the latter and simultaneously, at the other side of said connections, it rolls radially outward away from the piston rod. The interior hollow space of the sealing sleeve communicates with cooling fluid inlet and outlet openings in the axial cylinder wall.

1 Claim, 5 Drawing Figures

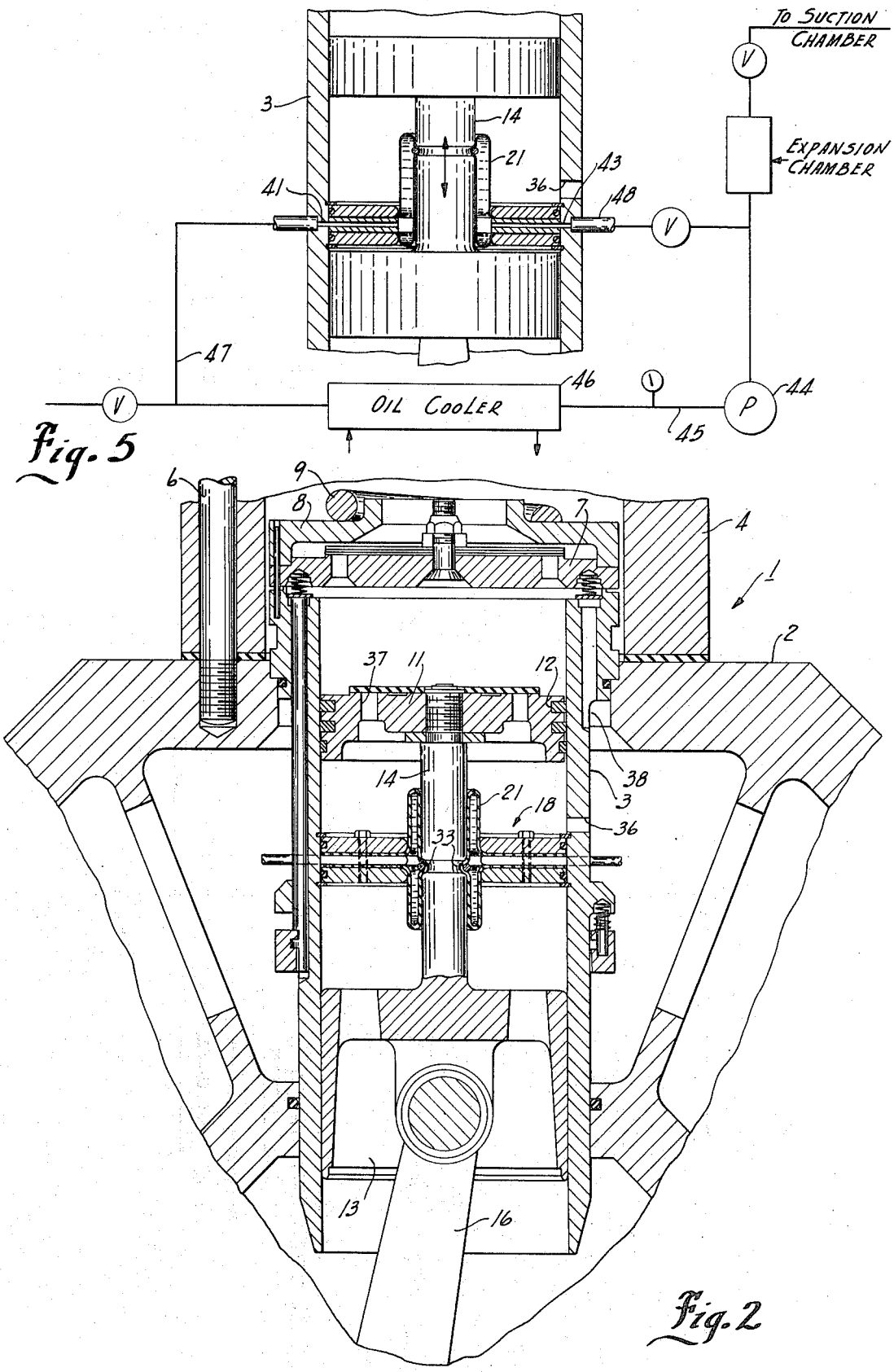

Patented Feb. 5, 1974

GAS COMPRESSOR HAVING ROLLING TYPE SEALING DIAPHRAGM

The invention relates to the sealing of the compression chamber of a gas compressor against leakage of oil into it from the crankcase of the compressor.

In gas compressors for refrigerating systems, provisions have heretofore been made to keep crankcase oil from leaking into the compression chamber. For that purpose a sealing partition has been arranged within the compression cylinder between a dry compression chamber containing the piston and a wet guide chamber for a cross head. The piston and cross head are connected by a piston rod for unitary reciprocating movement, as shown for instance in U.S. Pat. No. 3,490,683 issued Jan. 20, 1970 to Erich J. Kocher for "Gas Compressor." In order to keep crankcase oil from leaking through the partition past the piston rod, a stuffing box type of seal has heretofore been used but, as is well known, that type of seal is inherently capable only of reducing fluid leakage but does not afford a positive seal.

Generally, it is an object of the present invention to provide in a gas compressor a sealing partition which positively prevents any fluid leakage from the wet cross head guide chamber into the dry compression chamber of the compression cylinder.

More specifically, it is an object of the invention to provide an improved sealing partition of the above outlined character, incorporating a rolling type sealing diaphragm which is secured against axial bodily displacement by radially inner and outer connections thereof with the piston rod and cylinder, respectively, and which while rolling back and forth along the piston rod, leaves gas inlet openings in the cylinders below the piston unobstructed at all times.

A further object of the invention is to provide for improved heat dissipation from a sealing partition of the above outlined character by the circulation of cooling fluid therethrough.

A further object of the invention is to provide an improved sealing device of the hereinabove outlined character which is relatively simple in construction, reliable in operation and which may be manufactured at relatively low costs.

These and other objects and advantages are attained by the present invention, various novel features of which will become apparent from the description herein of a preferred embodiment of the invention shown in the accompanying drawings in which:

FIG. 2 is a view similar to FIG. 1 and showing the compressor and sealing partition in a different operating condition;

FIG. 5 is a schematic view of a cooling system for the sealing partition shown in FIGS. 1-4.

Figure 1:
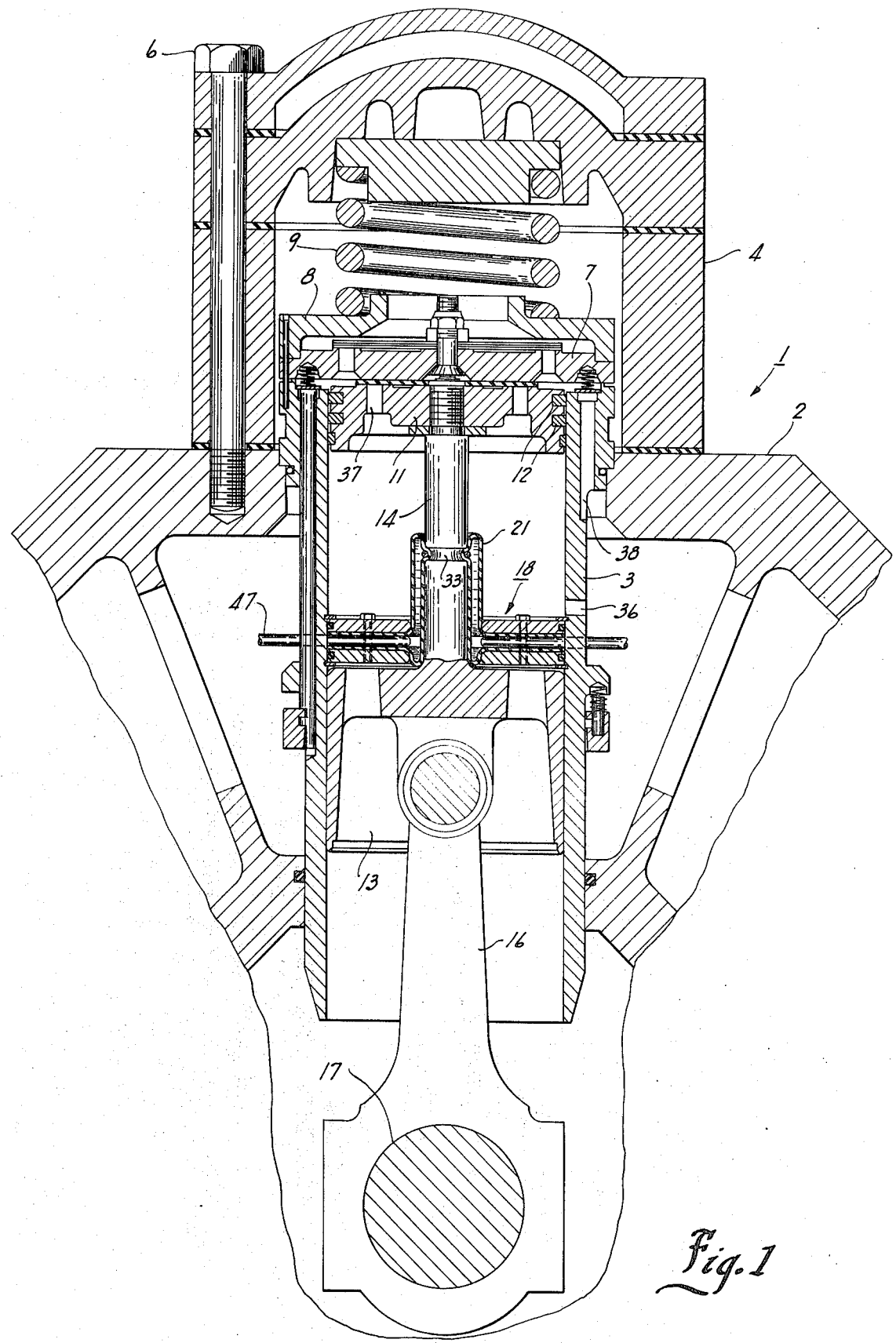
FIG. 1 is a sectional partial view of a gas compressor incorporating a sealing partition embodying the invention.

Referring to FIG. 1, a reciprocating piston type refrigerant compressor is generally designated by the reference numeral 1 and comprises a frame 2 mounting a compression cylinder 3 by means of a bonnet assembly 4 retained on the frame by cap screws 6. The top of the cylinder 3 is closed by an end cover 7 which is yieldingly pressed against the cylinder by a retainer 8 and a compression spring 9 reacting between the bonnet 4 and the retainer 8. A compressor piston 11 in the upper part of the cylinder 3 has sealing rings 12 in contact with the inner cylinder surface, and a crosshead 13 in the lower part of the cylinder 3 is connected with the piston 11 by a piston rod 14. The crosshead 13 has a connecting rod 16 which is journalled on a crankshaft 17. Rotation of the crankshaft 17 causes the piston 11, crosshead 13 and piston rod 14 to reciprocate as a unit within the cylinder.

A sealing partition generally designated by the reference numeral 18 divides the interior of the cylinder 3 into an upper dry compartment containing the piston 11, and a lower wet guide compartment for the crosshead 13.

Figure 3:
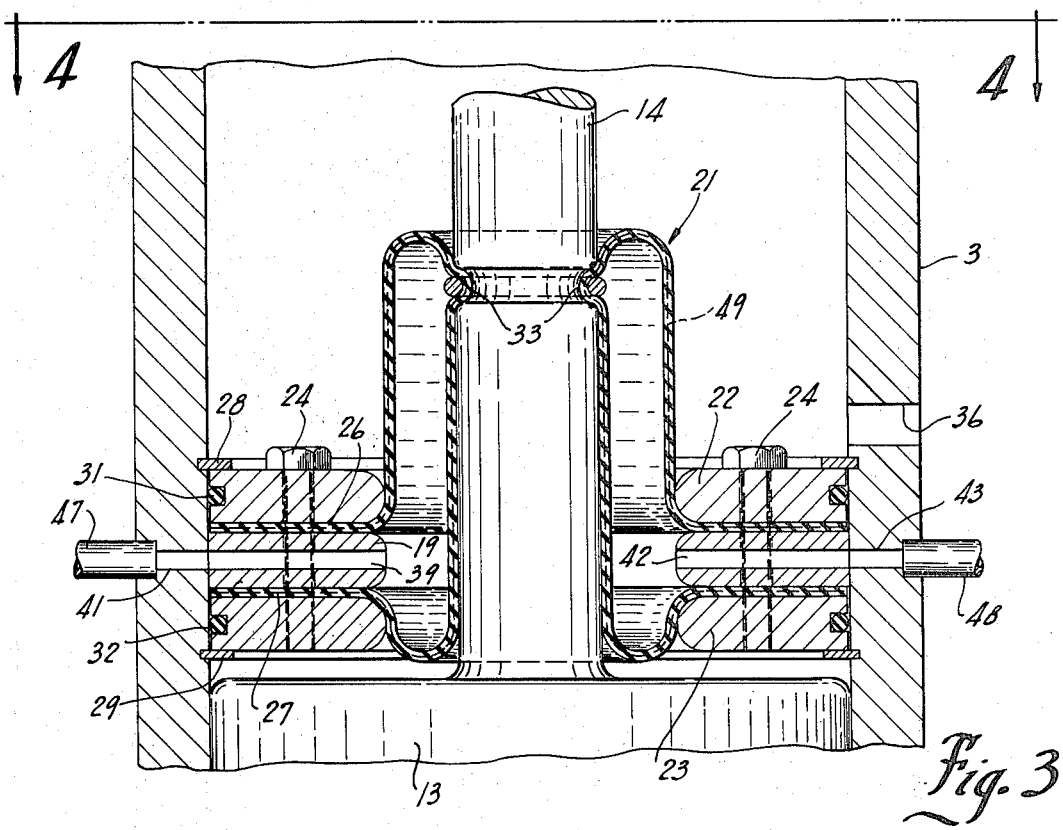
FIG. 3 is an enlarged sectional view of the sealing partition on line 3—3 of FIG. 4.

Referring to the enlarged view of FIG. 3, the sealing partition 18 comprises a metallic stationary ring element 19, a flexible, hollow sleeve-like sealing member 21, upper and lower pressure plates 22 and 23, and an annular series of bolts 24 connecting the upper and lower pressure plates. The sealing member 21 is made of elastomeric material and has two relatively spaced radial flanges 26 and 27, the flange 26 being sandwiched between the upper side of the ring 19 and the upper pressure plate 22, and the lower flange 27 of the sealing sleeve being sandwiched between the underside of the ring 19 and the lower pressure plate 23. The bolts 24 extend freely through holes in the upper pressure plate and through aligned holes in the flanges 26, 27 and in the ring 19. The lower ends of the bolts 24 are screw threaded into the lower pressure plate 23, and the bolts are drawn up tight so as to press the flanges 26, 27 fluid tight against the ring 19. The entire assembly of ring 19, sleeve 21 and pressure plates 22, 23 is retained in an axially fixed position within the cylinder 3 by an upper snap ring 28 seated in a circumferential groove of the cylinder 3 and overlapping the upper pressure plate 22, and by a lower snap ring 29 seated in a circumferential groove of the cylinder and overlapping the underside of the pressure plate 23. O-rings 31 and 32 in outer peripheral grooves of the upper and lower pressure plates sealingly engage the inner wall of the cylinder 3.

The piston rod 14 has an annular groove 33 about midway between the piston 11 and the cross head 13, and a resilient clamping ring 34 embraces the wall of the sealing sleeve 21 within the interior hollow space of the latter and presses the portion of the wall surrounding the groove 33 into the latter, thereby securing the sealing sleeve against axial bodily displacement relative to the piston rod 14.

In operation, the piston 11, cross head 13 and piston rod 14 reciprocate within the cylinder. FIG. 2 shows the piston 11 in a mid-position between its dead-center top position and its dead-center bottom position. In that condition of the parts of the compressor, the sealing sleeve 21 extends about equally in opposite directions along the piston rod 14 and in sealing engagement therewith. Axial movement of the piston rod in an upward direction causes the sealing sleeve above its connection with the piston rod and pressure ring 19 to roll away from the piston rod 14 in a radially outward direction and at the same time the sealing sleeve at the lower side of its connection with the piston rod 14 rolls upon the piston rod in a radially inward direction. The condition of the sealing sleeve upon completion of an upstroke of the piston 11 is shown in FIGS. 1 and 3.

The cylinder 3 has a gas inlet opening 36 immediately above the upper pressure ring 22 of the sealing partition 18 and the piston 11 has valve controlled gas passages 37 leading to the high pressure side of the compressor. Upon a down stroke of the piston, the gas admitted through the inlet passage 36 is drawn by suction into the space above the piston 11 and at the same time, gas is also admitted to the space above the piston through auxiliary valve controlled passages 38. During such down stroke of the piston, the sealing sleeve 21 while rolling upward on the piston rod 14 leaves the gas inlet opening 36 of the cylinder entirely unobstructed.

Referring again to FIG. 3, it will be noted that the ring 19 has a radial, internal passage 39 in communication with a through-bore 41 in the cylinder 3. Diametrically opposite to the passage 39 the ring 19 has another radial passage 42 in communication with another through-bore 43 of the cylinder 3.

Cooling fluid may be admitted through the bore 41 into the interior hollow space of the sleeve 21 and emitted therefrom through passage 42 and bore 43 by means of a fluid circulating system diagrammatically indicated in FIG. 5. As shown in that figure, an oil circulating pump 44 has an outlet connection 45 with an oil cooler 46 which in turn has an outlet connection 47 with the oil inlet passage 41 of the cylinder 3. An oil discharge conduit 48 returns the oil from the outlet passage 43 of the cylinder to the pump 44. In operation of the compressor, the heat which is developed due to the continuous flexing of the sealing sleeve and due to the gas compression within the cylinder 3 is effectively dissipated by the oil which circulates through the interior of the sealing sleeve 21.

Figure 4:
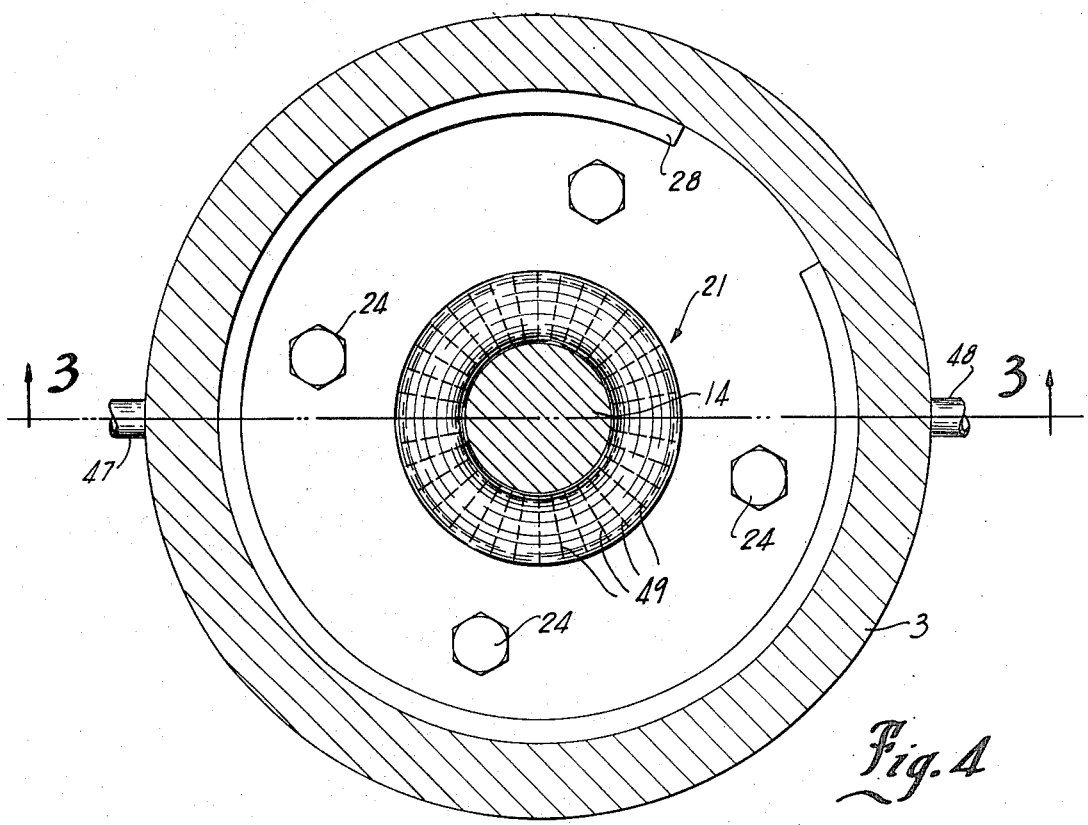
FIG. 4 is a sectional plan view on line 4—4 of FIG. 3.

For purposes of reinforcement, a soft ply web is embedded within the sealing sleeve 21. Such ply web preferably consists of strands 49 of soft yarn which as shown in FIG. 3 extend longitudinally of the sleeve and which as shown in FIG. 4 are separated from each other in the circumferential direction of the sleeve so as to accommodate the deformations of the sleeve to which it is subjected during its up and down rolling along the piston rod 14.

I claim:

1. In a gas compressor; a cylinder, a piston and a cross head rigidly interconnected by a connecting rod for unitary back and forth movement within opposite end portions, respectively, of said cylinder, working spaces for said cross head and piston, and positioning means for sealing the working space for said cross head from the working space for said piston within said cylinder, said partitioning means comprising a ring element projecting radially inward from the peripheral wall of said cylinder between said working spaces and surrounding said connecting rod in radially spaced relation thereof; a flexible sealing member of the rolling diaphragm type operatively interposed between said connecting rod and ring element so as to present looped sleeve portions of said sealing member at the axially opposite sides of the ring element rollingly embracing said connecting rod, said looped sleeve portions being radially spaced from said peripheral cylinder wall so as to be surrounded by an unobstructed annular space within said cylinder; and a fluid circulating system including pump means operatively connected in fluid admitting and emitting relation with said sealing member for distending the latter and dissipating heat therefrom said diaphragm having a pair of axially opposite flanges at its outer periphery overlapping said ring element at its axially opposite sides, respectively; and fastening means in cooperative engagement with said flanges for retaining the latter in sealing engagement with the axially opposite sides, respectively, of said ring element.

* * * * *